US011240338B2

(12) United States Patent
Gallagher

(10) Patent No.: US 11,240,338 B2
(45) Date of Patent: Feb. 1, 2022

(54) INTEGRATED CONTENT DELIVERY OF ENHANCED MOBILE GATEWAY SYSTEM

(71) Applicant: Cisco Technology, Inc., San Jose, CA (US)

(72) Inventor: Mark Gallagher, Newbury (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 98 days.

(21) Appl. No.: 16/660,602

(22) Filed: Oct. 22, 2019

(65) Prior Publication Data
US 2021/0120094 A1 Apr. 22, 2021

(51) Int. Cl.
H04L 29/08 (2006.01)
H04W 12/08 (2021.01)
H04W 88/16 (2009.01)
H04W 92/16 (2009.01)

(52) U.S. Cl.
CPC ........ H04L 67/2842 (2013.01); H04L 67/303 (2013.01); H04L 67/322 (2013.01); H04L 67/327 (2013.01); H04W 12/08 (2013.01); H04W 88/16 (2013.01); H04W 92/16 (2013.01)

(58) Field of Classification Search
None
See application file for complete search history.

(56) References Cited

U.S. PATENT DOCUMENTS

| 8,064,909 | B2 | 11/2011 | Spinelli |
| 9,237,480 | B2 | 1/2016 | Ludwig |
| 9,386,077 | B2 | 7/2016 | Kotecha |
| 10,085,185 | B2 | 9/2018 | Bindrim |
| 2007/0245409 | A1* | 10/2007 | Harris ..................... H04L 69/10 726/5 |
| 2012/0259821 | A1* | 10/2012 | Alam .................. G06F 16/1744 707/692 |
| 2015/0016256 | A1* | 1/2015 | Skog ...................... H04W 4/18 370/235 |
| 2015/0063249 | A1 | 3/2015 | Jover |
| 2016/0119194 | A1* | 4/2016 | Valencia Lopez .......................... H04L 67/2804 709/223 |

(Continued)

FOREIGN PATENT DOCUMENTS

EP 2 843 889 3/2015

OTHER PUBLICATIONS

International Search Report and Written Opinion for International Application No. PCT/US2020/055196, dated Dec. 3, 2020.

Primary Examiner — Otis L Thompson, Jr.
(74) Attorney, Agent, or Firm — Baker Botts, LLP

(57) ABSTRACT

In one embodiment, a method includes: receiving, from a mobile gateway associated with the computing system, a first request for first content provided by a content publisher, the first request being sent from a mobile device; determining, based on information associated with the first request and one or more policies, that the first content is to be provided to the mobile gateway through one or more caching gateways associated with the mobile gateway; identifying at least one of the one or more caching gateways to provide the requested first content; and sending, to the mobile gateway, first instructions configured to cause the mobile gateway to obtain the requested first content from the identified at least one caching gateway.

20 Claims, 9 Drawing Sheets

(56) References Cited

U.S. PATENT DOCUMENTS

| | | |
|---|---|---|
| 2016/0323408 A1 | 11/2016 | Chung |
| 2019/0007522 A1 | 1/2019 | Satzke |
| 2019/0124175 A1* | 4/2019 | Sahar .................. H04L 65/4084 |

* cited by examiner

INTEGRATED CONTENT DELIVERY OF ENHANCED MOBILE GATEWAY SYSTEM

TECHNICAL FIELD

The present disclosure relates generally to a mobile gateway system configured to provide efficient content delivery.

BACKGROUND

A content delivery network (CDN) refers to a geographically distributed group of servers, such as proxy servers and their data centers, which work together to provide fast delivery of internet content by distributing a content delivery service spatially relative to end users. The CDN is a layer in the internet ecosystem. The CDN allows for the quick transfer of assets needed for loading internet content including HTML pages, JavaScript files, stylesheets, images, and videos. The popularity of CDN services continues to grow, and today a majority of web traffic is served through the CDN, including traffic from various websites of internet providers (i.e., content providers or content publishers).

DESCRIPTION OF EXAMPLE EMBODIMENTS

Overview

Figure 1:
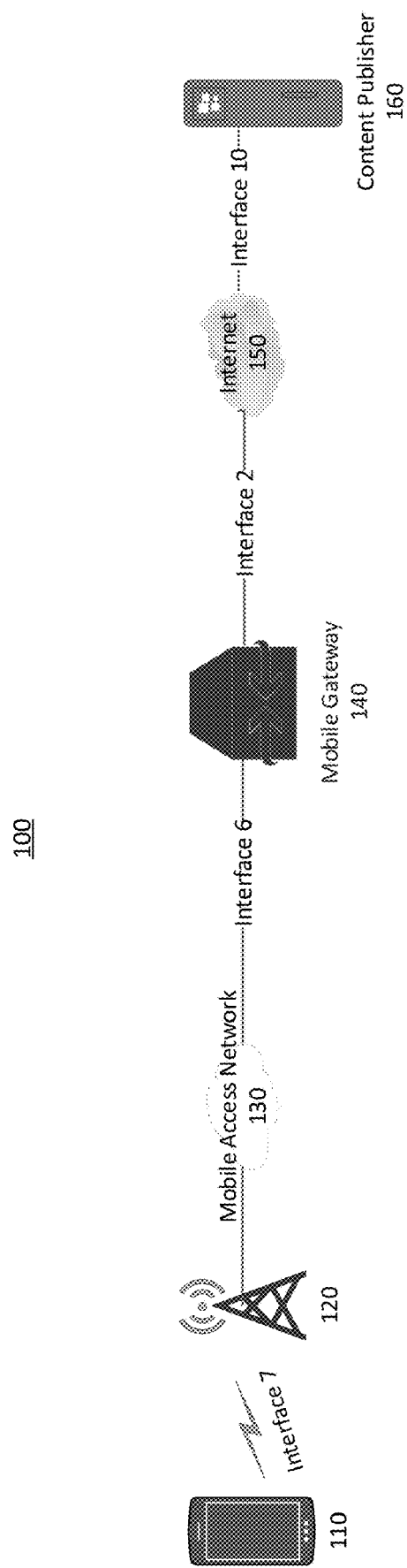
FIG. 1 illustrates an example of a network architecture for content delivery through a mobile access network and an internet network.

Particular embodiments described herein provide a mobile device with an integrated content delivery service in a mobile network domain. This is accomplished by controlling a mobile gateway and one or more mobile caching gateways deployed in a mobile communication network to optimize how content is delivered to the mobile device. In particular embodiments, the mobile gateway (e.g., 210 in FIG. 2) may be in direct communication with caches, such as a caching gateway (e.g., 230 in FIG. 2) and/or a caching gateway with content delivery network capabilities (e.g., 240 in FIG. 2). The mobile gateway and the caching gateway are all deployed in the mobile network domain. A mobile gateway controller (e.g., 220 in FIG. 2) may monitor a network and decide whether to have the mobile gateway communicate directly with a content provider (e.g., 160 in FIG. 2) via internet protocol or have the mobile gateway communicate directly with one of the caching gateways (e.g., 230 or 240 in FIG. 2). In case the content delivery could be serviced by the caching gateway, a client profile may be created and used to determine how the content will be delivered.

Example Embodiments

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable non-transitory media containing instructions. One or multiple systems, devices, components, etc., may comprise one or more embodiments, which may include some elements or limitations of a claim being performed by the same or different systems, devices, components, etc. A processing element may be a general processor, a task-specific processor, a core of one or more processors, or other co-located, resource-sharing implementation for performing the corresponding processing. The embodiments described hereinafter embody various aspects and configurations, with the figures illustrating example and non-limiting configurations. The term "apparatus" is used consistently herein with its common definition of an appliance or device. The term "gateway" is used as "a network node" or "network entity" which are used consistently herein with apparatus as described above.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily denote an ordering such as one unit, operation or event occurring or coming before another or another characterization, but rather provides a mechanism to distinguish between element units. Moreover, the phrases "based on x" and "in response to x" are used to indicate a minimum set of items "x" from which something is derived or caused, wherein "x" is extensible and does not necessarily describe a complete list of items on which the operation is performed, etc. The term "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1 illustrates an example of a network architecture 100 for content delivery through a mobile access network and an internet network. Referring to FIG. 1, a mobile device 110 may wish to obtain content from a content publisher 160. To do so, the mobile device 110 may connect to a cellular base station 120, which in turn may connect, through a mobile access network 130, a mobile gateway 140. A mobile gateway controller of the mobile gateway 140 may ensure that the mobile device 110 remains associated with the correct mobile gateway 140. Through the mobile gateway 140, outbound data sent by the mobile device 110 may be packaged for IP routing and incoming IP packets may be routed to the intended mobile device 110. For example, when the mobile device 110 sends a request, the mobile gateway 140 may translate the mobile device's data into IP packets and send them through the internet network 150 to the content publisher 160. The content publisher 160, which may make content available via a server connected to the internet network 150, may then process the request from the mobile device 110 and send back the requested content. To enhance delivery performance, the content publisher may use a caching mechanism, such as those provided by a CDN.

While the caching mechanism described above could improve content delivery performance and efficiency generally, it is not optimal for content that is delivered to mobile devices 110. Notably, the aforementioned caching mechanism is provided after internet 150. This means that the benefits of the caching mechanism would not be realized until after the request from the mobile device 110 is packaged into IP packets and routed through the internet 150. Although the architecture of such a caching mechanism may provide caching benefits to any device requesting content via the internet 150, it is not optimal for mobile devices since these devices may be geographically spread and that information is obscured from the content publisher or CDN. With content being increasing consumed via mobile devices 110, an improved content delivery architecture is needed for mobile devices.

Figure 2:
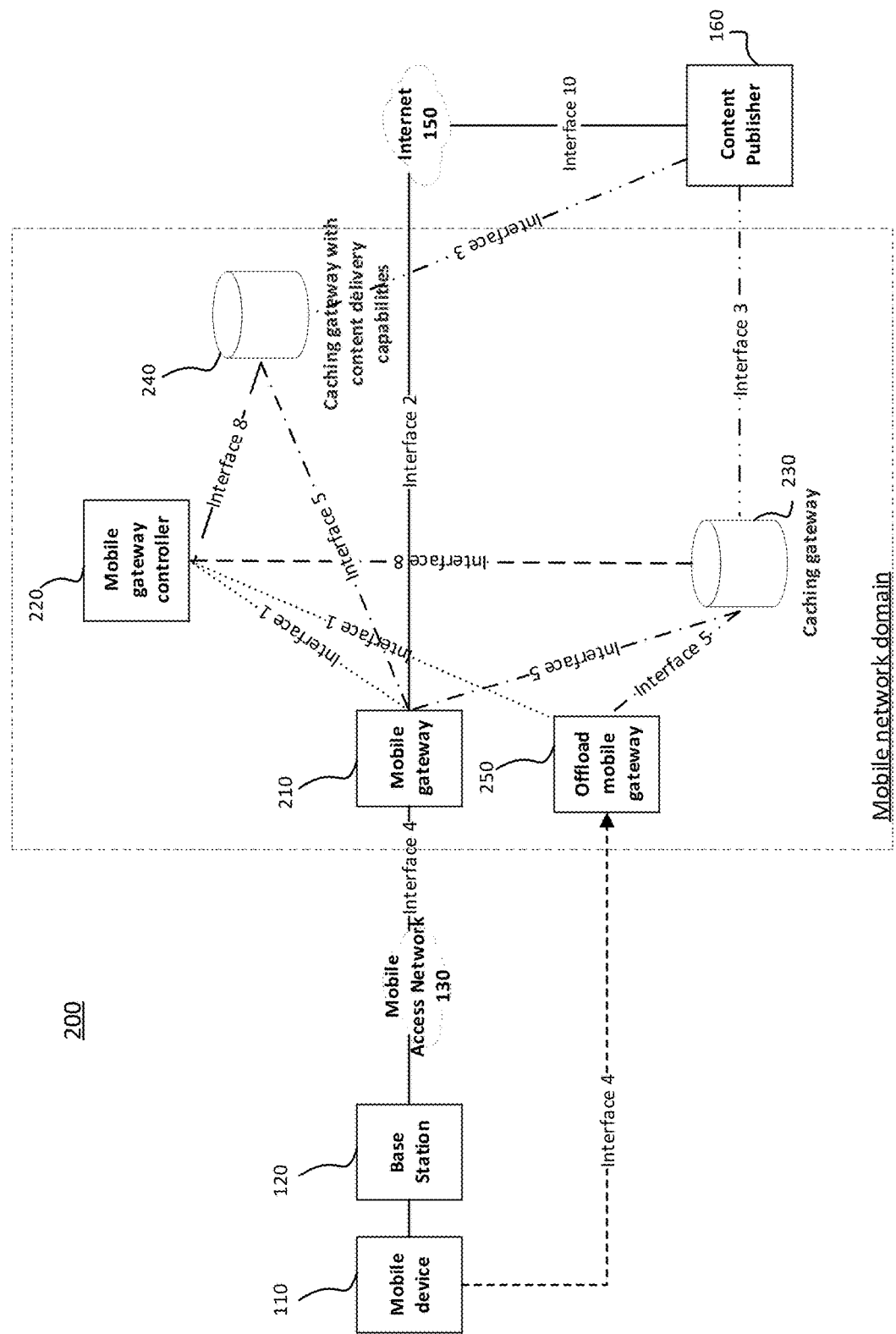
FIG. 2 illustrates an example of an architecture of an integrated content delivery system that is integrated with a mobile gateway system.

FIG. 2 illustrates an example of an architecture 200 of an integrated content delivery system that is integrated with a mobile gateway system. In particular embodiments, the mobile gateway system is designed to adaptively provide traditional distributed content delivery service (e.g., as described with reference to FIG. 1) and an optimized content delivery service for devices within a mobile network domain. The mobile gateway system is designed to help distribute content quickly, reliably, and security in response to content requests from mobile devices. As will be described in more detail below, the mobile gateway system provides a mobile gateway 210 with local caching mechanisms (e.g., via a caching gateway or an integrated caching capability) so that the benefit of caching can be realized earlier in the content delivery process. In particular, by equipping mobile gateways 210 with a caching mechanism, content requests from a mobile device could be serviced by the mobile gateway 210's caching mechanism. This new architecture obviates the need for translating the content request into public IP packets, routing the packets through the internet 150, obtaining the desired cached content from a server associated with the content publisher 160, and routing the content back to the mobile gateway 210.

In FIG. 2, the mobile gateway system for integrating the content delivery service may comprise, but not limited to, mobile gateway 210 and mobile gateway controller 220. The mobile gateway system may be integrated with one or more caching gateways 230 and 240, which could be implemented as a subsystem, capability, or function that is controlled by the mobile gateway system. Such mobile gateway systems may be spatially distributed across a mobile network, with each being able to perform content-delivery optimizations based on network traffic, content type, quality of service, network policies, security protocol, etc. Although FIG. 2 illustrates an example where a mobile gateway 210 is associated with two mobile caching gateways 230 and 240, it should be understood that any number of mobile caching gateway may be associated with any mobile gateway 210. As previously mentioned, embodiments of the mobile gateway described herein provide several benefits over traditional systems. As described in FIG. 1, the content delivery service is provided by the content publisher 160 to the mobile device 110 via the internet network 150. The mobile gateway 140 in FIG. 1 performs the function of transforming cellular requests sent by the mobile device 110 into IP packets in order to be transmitted via the internet network 150, and the benefits of content caching is not realized until later in the process when the IP packets are received by the content publisher 160 or its content delivery network. In contrast, the mobile gateway 210 in FIG. 2 may be controlled by the mobile gateway controller 220 to directly communicate with the caching gateway 230 and/or 240 such that the mobile gateway 210 can retrieve a copy of the content locally stored at the caching gateways 230 and/or 240, if the content has already been cached. If the content has not yet been cached, the caching gateway 230 or 240 may request the content from the content publisher 160 and cache it for subsequent retrieval. Detailed descriptions about respective components are followed hereinafter.

In one embodiment, referring to FIG. 2, the mobile gateway 210 may enable secure connectivity between the mobile device 110 and the network entities (e.g., the mobile gateway controller 220, the caching gateways 230 and 240, and the content publisher 160 shown in FIG. 2). For the secure connectivity, the mobile gateway 210 may perform functions for treatment of traffic data in suitable and designated format to communicate with the network entities based on network policies and capabilities. The mobile gateway 210 may associate and communicate with the mobile gateway controller 220 via a dedicated interface (e.g., "interface 1" shown in FIG. 2). The mobile gateway 210 may directly communicate with the caching gateways 230 and 240 via a dedicated interface (e.g., "interface 5" shown in FIG. 2), and further communicate with the content publisher 160 via internet interface 150 (i.e., "interface 2" shown in FIG. 2). That is, the mobile gateway 210 may select, under the control of the mobile gateway controller 220, one or more routes from three traffic routs to be used for providing the content delivery service in the mobile network domain. The mobile base station 120 may send, to the mobile gateway 210, a request for delivering a specific content (e.g., a video streaming), which is originated from the mobile device 110, through the mobile access network 130 via interface 6 (e.g., GTP tunnel protocol) in FIG. 2. The mobile gateway 210 may send a message including the request back to the mobile gateway controller 220 such that the mobile gateway controller 220 checks if the mobile device 110 and its request have a capability (i.e., an enhanced capability to use the mobile caching gateways within the mobile network domain) to receive the content delivery service from the mobile gateway system 110. The message may include information related to a status of the mobile device and a status of the requested content, indicating various parameters (or factors), for example, but not limited to, a traffic type of the requested content, traffic intensity, authenticity and authorization of the mobile device 110, quality of service (QoS), security, timelines, etc. In another embodiment, the mobile gateway 210 may be integrated with the mobile gateway controller 220 or stand-alone entity separately from the mobile gateway controller 220.

In one embodiment, if the requested content is determined to be a specific content, which may be predetermined to set up as, for example, but not limited to, a traffic type, a traffic congestion, a user preference, a factory default, emergency, or network policy in the mobile device 110, the mobile device 110 may directly connect from the mobile base station 120 to a dedicated mobile subsystem (e.g., "offload mobile gateway 250" in FIG. 2) via a dedicated interface (e.g., "interface 4" shown in FIG. 2) without passing through the mobile access network 130 (e.g., the mobile access network may be embodied such as, for example, but not limited to, access point name (APN) or virtual private network (VPN)). Herein, the offload mobile gateway 250 may be controlled by the mobile gateway controller 220 to perform functions for delivering a copy of the specific content to the mobile device 110 or retrieving the specific content from the content publisher 160 via the mobile gateway 230. When the offload mobile gateway 250 delivers the specific content using the content publisher 160, the offload mobile gateway 250 may receive, for example, but not limited to, a device profile, a user profile, meta data, identifier for a mobile gateway (e.g., identifier for the caching gateway 230) from the mobile gateway controller 220 on which the offload mobile gateway 250 communicates with the caching gateway 230 via a dedicated interface (e.g., "interface 5" shown in FIG. 2) to retrieve the specific content stored at the content publisher 160.

In one embodiment, the mobile gateway controller 220 may control the mobile gateway 210 and one or more caching gateways (e.g., 230 and 240 deployed in the mobile network domain) to perform functions for delivering the content requested from the mobile device 110. When the mobile gateway controller 220 receives the request for content delivery, the mobile gateway controller 220 may perform a capability check to determine whether the mobile device 110 and/or the mobile gateway 210 have an enhanced capability to support the enhanced content delivery service provided within the mobile network domain. The mobile gateway controller 220 may identify if the mobile device 110 and the requested content have the enhanced capability by analyzing the various parameters (information or factors), for example, but not limited to, the traffic type of the requested content, the traffic intensity, the authenticity and authorization of the mobile device 110, the quality of service (QoS), the security, the timeliness, etc., with respect to the status of the mobile device 110 and the status of the requested content, based on the information of the requested content and the mobile device which is included in the request sent by the mobile gateway 210. That is, the mobile gateway controller 220 may determine whether the requested content can be provided to the mobile gateway 210 through at least one of the one or more caching gateways via the dedicated interface protocol (e.g., "interface 5" in FIG. 2). To perform the capability check, the mobile gateway controller 220 may obtain meta data associated with the mobile device 110 through the request. The mobile gateway controller 220 may obtain meta data associated with mobile gateway 210 and/or the caching gateway 230/240 to determine whether the enhanced content delivery service is supported. The mobile gateway controller 220 may access the meta data stored locally or obtain it from the mobile gateway 210 and/or the caching gateway 230/240 via, respectively, the dedicated interface protocol of interface 1 and/or the dedicated interface protocol of interface 8.

In one embodiment, if the mobile gateway controller 220 determines that the mobile device 110 and/or the requested content are subject to, and ensured to set up, the enhanced capability for the content delivery service eligible to be served within the mobile network domain, the mobile gateway controller 220 may send instructions (hereinafter referred to as "first instructions" for convenience of descriptions) to cause the mobile gateway 210 to directly communicate with the one or more caching gateways (e.g., the caching gateways 230 and 240) via a dedicated interface protocol (e.g., "interface 5" in FIG. 2) and to thereby obtain the requested content from the one or more caching gateways. Further, the mobile gateway controller 220 may generate "a traffic quality profile" and/or "a mobile profile" (or "a device profile") with respect to the requested content and the mobile device 110, and then transmit the generated traffic quality profile and the generated mobile profile to the one or more caching gateways (e.g., the caching gateways 230 and 240) via a dedicated interface protocol (e.g., "interface 8" shown in FIG. 2). Herein, the traffic quality profile may indicate information related to a traffic of a mobile network system and include information for at least one of, for example, but not limited to, the quality of service (QoS), the security, the traffic type (e.g., a content type, a content size, etc.), network policy or a traffic congestion. The mobile profile may indicate information related to the mobile device 110 and may include information for at least one of, for example, but not limited to, a device type, authentication, authorization, subscription, or a user profile. The mobile gateway controller 220 may further identify (or determine) which caching gateway is suitable to perform a caching process for the requested content based on at least one of, for example, but not limited to, (1) routing metrics, (2) traffic congestion status associated with the one or more caching gateways, or (3) a historical record to have previously performed the caching process for the requested content. That is, the mobile gateway controller 220 may select a specific caching gateway from among the one or more caching gateways to perform a caching process for the requested content. The mobile gateway controller 220 may send other instructions (hereinafter, referred to as "third instructions" for convenience of descriptions), which include the traffic quality profile and/or the mobile profile, to cause at least one of the one or more caching gateways to verify with the content publisher whether the mobile device 100 has permission to access the requested first content.

In one embodiment, in case the mobile device 110 may not be authorized nor authenticated to use the mobile gateway caching system, the mobile gateway controller 220 may determine that the mobile device 110 and/or the requested content are not subject to, nor ensured to set up, the enhance capability for the content delivery service served within the mobile network domain. The mobile gateway controller 220 may control the mobile gateway 210 to provide the requested content using a traditional route, i.e., within an internet domain, not the mobile network domain. To do so, the mobile gateway 210 may perform the functions for providing the mobile device 110 with the requested content in such a manner as described in FIG. 1. That is, the mobile gateway controller 220 may send other instructions (hereinafter, referred to as "second instructions" for convenience of descriptions) to the mobile gateway 210 to cause the mobile gateway 210 to directly communicate with the content publisher 160 through the internet 150 via dedicated interface protocols (e.g., "interface 2" and "interface 10" in FIG. 2) and to thereby obtain the requested content from the content publisher 160.

In one embodiment, the mobile caching gateways may be embodied to be separate caching gateway functions (i.e., network entities) (e.g., separate caching gateway 240 in FIG. 2). The mobile caching gateways may be also embodied to be integrated caching gateway functions included within the mobile gateway system 100 (e.g., integrated caching gateway 230 in FIG. 2). In another embodiment, the mobile caching gateway may perform various functions to operate as a caching gateway as well as a content delivery gateway. The mobile caching gateways 230 and 240 may receive the traffic quality profile and mobile profile, included in the third instruction, from the mobile gateway controller 220. Both or either of the mobile caching gateways 230 and 240 may be selected by the mobile gateway controller 220, to perform functions for delivering the requested content which the mobile device 110 requests. The mobile caching gateways 230 and 240 may then determine what content is needed based on the requested content's status, the traffic quality profile and the mobile profile. If the requested content is available to retrieve in non-transitory record media (i.e., cache) of the mobile caching gateways 230 and 240 (i.e., if the requested content is determined to have the enhanced capability), they may deliver a local copy for the requested content to the mobile gateway 210 via the dedicated interface protocol (e.g., "interface 5" in FIG. 2). If the mobile caching gateways 230 and 240 have no local copy of the requested content, they may send the content publisher 160 a request message for a new copy and caching for the requested content via a dedicated interface protocol (e.g., "interface 3" in FIG. 2). The mobile caching gateways 230 and 240 may send the new copy to the mobile gateway 210. When the mobile caching gateways 230 and 240 request the new copy, they may ask whether a particular user of the mobile device 110 has subscription or authentication to access the requested content by sending an authentication message to the content publisher 160 via interface 3.

In one embodiment, when the mobile caching gateways 230 and 240 request the requested content to the content publisher 160, the mobile caching gateways 230 and 240 may request a redirection message for delivering the mobile caching gateways 230 and 240 the requested content via the dedicated interface protocol (i.e., interface 3 in FIG. 2), not via the internet (i.e., interface 10 in FIG. 2). For example, the mobile caching gateways 230 and 240 may request the content publisher 160 for a hypertext transfer protocol (HTTP) redirection. This means that when the mobile device 110 (or an application installed in the mobile device 110 using a specific web protocol) is seen by the content publisher 160, the content publisher 160 may switch uniform resource locator (URL) corresponding to the requested content from its original internet URL to an address of the mobile caching gateways 230 and 240. As another example, the mobile caching gateways 230 and 240 may request the content publisher 160 for an IP redirection. This means that the mobile device 110 or an application installed in the mobile device 110 uses a specific IP endpoint method such as domain name system (DNS) including proxy, routing change or similar, the mobile caching gateways 230 and 240 may request the content publisher 160 to establish a preferred endpoint for the requested content as the caching gateway. As another example, the mobile gateway controller 220 and the mobile caching gateways 230 and 240 may create a specific network (e.g., a virtual private network (VPN) or an Access Point Name (APN)) to provide the mobile device 110 with the requested content via a traffic tunnel established by the specific network.

Figure 3:
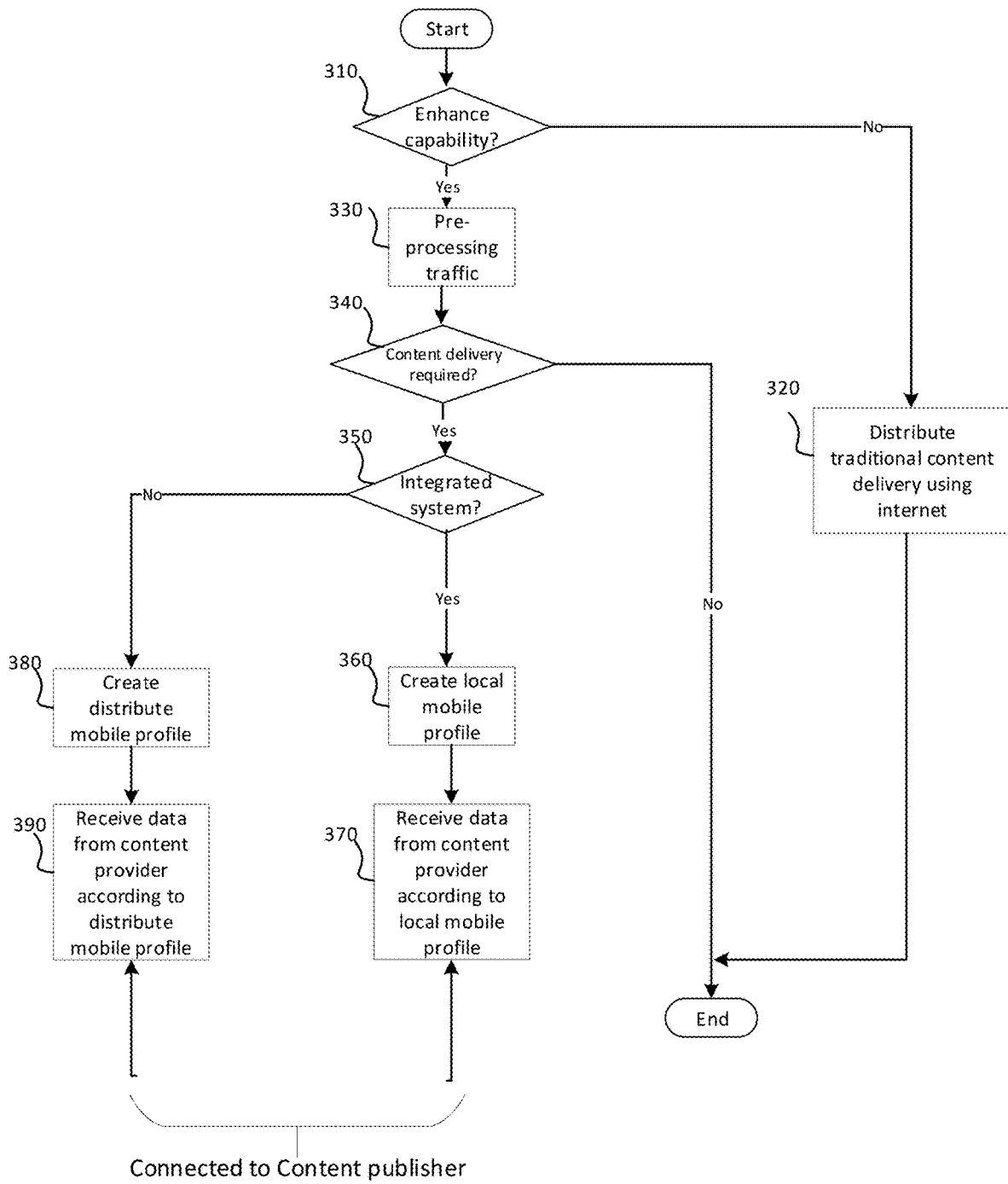
FIG. 3 illustrates an example of a control loop of an integrated content delivery in the mobile gateway system.

FIG. 3 illustrates an example of a control loop of integrated content delivery in the mobile gateway system. FIG. 3 is an example embodiment in which a separate caching gateway and an integrated caching gateway are both deployed in the mobile network domain of the mobile gateway system. The control loop may be executed by a controller. The controller may be interpreted to be, for example, but not limited to, a logical function or a logical network entity which includes, for example, the mobile network system itself, an integrated entity comprising both the mobile gateway 210 and the mobile gateway controller 220, or the mobile gateway controller 220 only. Referring to FIG. 3, when the controller (e.g., the mobile gateway controller 220 in FIG. 2) receives the request for delivering the content (e.g., a specific video streaming), in step 310, the controller may check if the mobile device and/or the mobile gateway has the enhanced capability to support the enhanced content delivery service provided within mobile network domain, using the mobile caching gateways deployed in the mobile network domain. If the mobile device and/or the mobile gateway is determined to have no enhanced capability, the requested content may be provided by the content publisher 160 through a traditional distributed content delivery system, as illustrated in FIG. 1, using an internet network infrastructure, i.e., in the internet domain (step 320). If the mobile device and/or the mobile gateway is determined to have the enhanced capability, the requested content may be identified to be processed by creating the traffic quality profile based on the status of the content and the network policy (step 330). In step 340, if the request for delivering the content delivery is requested in the mobile network domain, the controller may then determine whether the requested content is provided through the integrated caching gateway or through the separate caching gateway (step 350). If the requested content is determined to be provided through the integrated caching gateway, the controller may create a mobile profile (i.e., "a local mobile profile" adapted for the integrated caching gateway) based on the status of the requested content and the network policy related to the integrated caching gateway (step 360) and then push a traffic for the requested content to the local functions for the content delivery to receive the requested content from the content publisher (step 370). If the requested content is determined to be provided through the separate caching gateway, the controller may create a mobile profile (i.e., "a distributed mobile profile" adapted for the separate caching gateway) based on the status of the requested content and the network policy related to the separate caching gateway (step 380) and then push a traffic for the requested content to the local functions (i.e., the separate caching gateway) for content delivery to receive the requested content from the content publisher (step 390).

Figure 4:
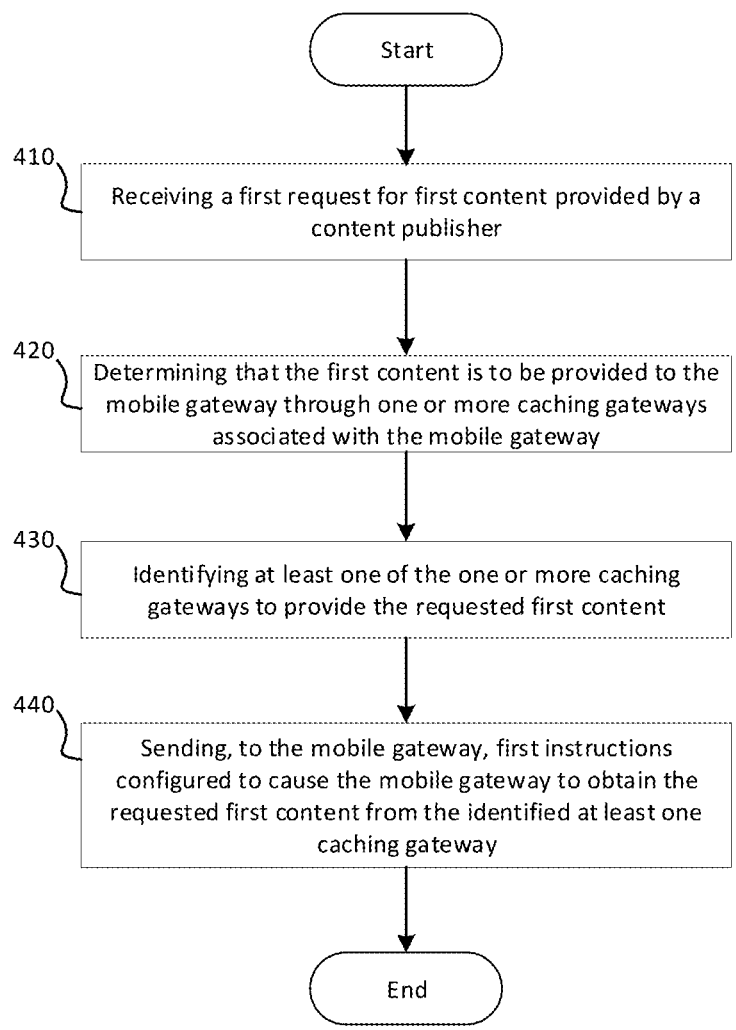
FIG. 4 illustrates an example of a simplified flow chart of an integrated content delivery performed in a mobile network domain.

FIG. 4 illustrates an example of a flow chart of an integrated content delivery performed in the mobile network domain. The method may be performed by a computing system (e.g., a mobile gateway system in FIG. 2) itself or a controller (e.g., a mobile gateway controller 220 in FIG. 2) included in the computing system, which is configured to perform functions for the integrated content delivery in the mobile network domain by controlling the mobile gateway (e.g., 210 in FIG. 2) and one or more caching gateways (e.g., 230 and 240 in FIG. 2). In one embodiment, the computing system (or the controller) may receive a first request for first content provided by the content publisher (e.g., 160 in FIG. 2) from the mobile gateway associated with the computing system, at step 410. Herein the first request may be sent from the mobile device (e.g., 110 in FIG. 2) through the mobile access network (e.g., 130 in FIG. 2). At step 420, the computing system may determine that the first content is to be provided to the mobile gateway through the one or more caching gateways associated with the mobile gateway, based on information associated with the first request and one or more policies. Herein the information associated with the first request may include the status of the first content which indicates various parameters (or factors), for example, but not limited to, a traffic type of the requested content, a user preference, authenticity and authorization of the mobile device. The network policies may include, for example, but not limited to, traffic intensity, quality of service (QoS), security, timelines, a traffic congestion, a factory default, emergency, etc. At step 430, the computing system may perform a process for identifying (or selecting) at least one of the one or more caching gateways to provide the requested first content in the mobile network domain, not in the internet domain such that the identified caching gateway provides the mobile device with delivering the requested content by communicating with the mobile gateway via the dedicated interface protocol (e.g., "interface 5" in FIG. 2). When the at least one caching gateway is selected (or identified) from among the one or more caching gateways, the computing system may send the mobile gateway first instructions which are configured to cause the mobile gateway to obtain the requested first content from the identified at least one caching gateway, at step 440.

Figure 5:
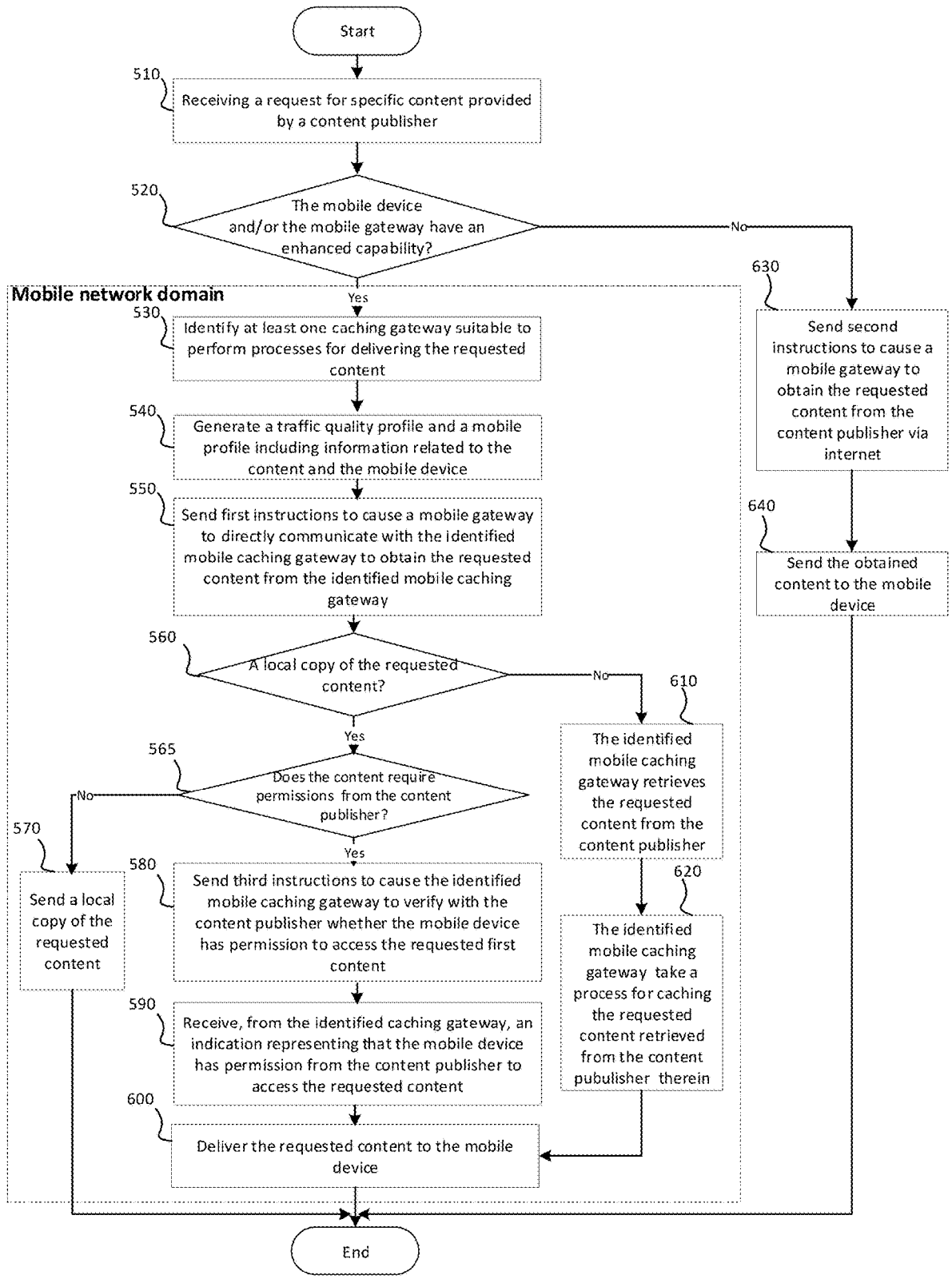
FIG. 5 illustrates an example of a flow chart of an integrated content delivery performed by the mobile gateway system.

FIG. 5 illustrates an example of a flow chart of an integrated content delivery performed by the mobile gateway system. Referring to FIGS. 2 and 5, the method may be performed by the mobile gateway system itself or the mobile gateway controller 220 included in the computing system, which is configured to perform functions for the integrated content delivery in the mobile network domain by controlling the mobile gateway 210 and the one or more caching gateways 230 and 240. In one embodiment, the mobile gateway controller 220 may receive a request for a specific content, which may be provided by the content publisher 160, from the mobile gateway 210 associated with the mobile gateway controller 220 via the dedicated interface (e.g., "interface 1" shown in FIG. 2), at step 510. Herein the request may be sent from the mobile device 110 through the mobile access network 130 (e.g., VPN, APN, 3GPP network, etc.). At step 520, the mobile gateway controller 220 may determine that the mobile device 110 (or a user of the mobile device) and/or the mobile gateway have the enhanced capability to support the enhanced ensure suitability for a content delivery service to be provided within the mobile network domain. If the mobile gateway controller 220 determines that the requested content and the mobile device 110 have the enhanced capability, the requested content may be serviced with the mobile network domain at steps 530~620. At step 530, the mobile gateway controller 220 may identify at least one caching gateway suitable to perform processes for delivering the requested content to the mobile device 110. That is, the at least one caching gateway may be selected by the mobile gateway controller 220 from among the one or more caching gateways based on the information of the requested content and the mobile device 110 which are sent from the mobile gateway 210. At step 540, if the mobile gateway controller 220 determines that the requested content and the mobile device 110 have the enhanced capability, the mobile gateway controller 220 may generate the traffic quality profile and the mobile profile (i.e., device profile), which include information related to the requested content, the mobile device 110 and the network policies, and then send the generated traffic quality profile and the generated mobile profile to the identified at least one mobile caching gateway. At step 550, the mobile gateway controller 220 may send first instructions to cause the mobile gateway 210 to directly communicate with the identified mobile caching gateway via the dedicated interface protocol (e.g., "interface 5" in FIG. 2) such that the mobile gateway 210 obtains the requested content from the identified mobile caching gateway. At step 560, when the identified mobile caching gateway receives a request for the content delivery for the requested content from the mobile gateway 210, the identified mobile caching gateway may determine whether it has a local copy of the requested content in its storage. At 565, if the identified caching gateway has the local copy of the requested content, the identified mobile caching gateway may further check whether the requested content requires permission to access or send the copy of the requested content. That is, the identified mobile caching gateway may check if the mobile device is authorized (or authenticated) to use or access the requested content. For example, in case the requested content may be classified to be used for subscribers only, further processes (e.g., steps 580 and 590 in FIG. 5) may be needed for checking permission for delivering the copy of the requested content. At step 570, if the identified caching gateway has the local copy of the requested content and the permission for delivering the requested content is not required, the identified caching gateway may perform functions for caching the requested content such that the mobile gateway obtains the requested content from the identified caching gateway. At step 580, if the permission for delivering the requested content is required, the identified caching gateway may send third instructions, which comprise the mobile profile, to the identified caching gateway via the dedicated interface protocol (e.g., "interface 3" in FIG. 2). Herein the third instructions may be configured to cause the identified caching gateway to verify with the content publisher whether the mobile device 110 has permission to access the requested content. At step 590, if the mobile device 110 has the permission to access the requested content, the identified caching gateway may receive, in response to the third instructions, an indication (or a response message or acknowledge) representing that the mobile device has permission from the content publisher 160 to access the requested content. At step 600, the mobile gateway 210 may obtain the requested content (i.e., a copy of the requested content cached in the identified caching gateway) from the identified caching gateway through steps 560 to 590, and then deliver the obtained content to the mobile device 110. Further, if the identified mobile caching gateway is determined to have the local copy of the requested content at step 560, the identified mobile caching gateway may communicate with the content publisher 160 to obtain the requested content (step 610). At step 620, the identified mobile caching gateway may retrieve the requested content from the content publisher 160, send the requested content to the mobile device 110 via the dedicated interface protocol (e.g., "interface 3" in FIG. 2), and cache the retrieved content to be used for a local copy of the content when it is requested in future.

In one embodiment, if the mobile gateway controller 220 determines that the mobile device 110 and/or the mobile gateway 210 do not have the enhanced capability at step 520, the mobile gateway controller 220 may send second instructions to cause the mobile gateway 210 to perform processes to obtain the requested content by means of a traditional route, i.e., within the internet domain, not the mobile network domain at step 630. At step 640, the mobile gateway 210 may directly communicate with the content publisher 160 through the internet 150 to obtain the requested content from the content publisher 160, and then deliver the obtained requested content to the mobile device 110.

Figure 6:
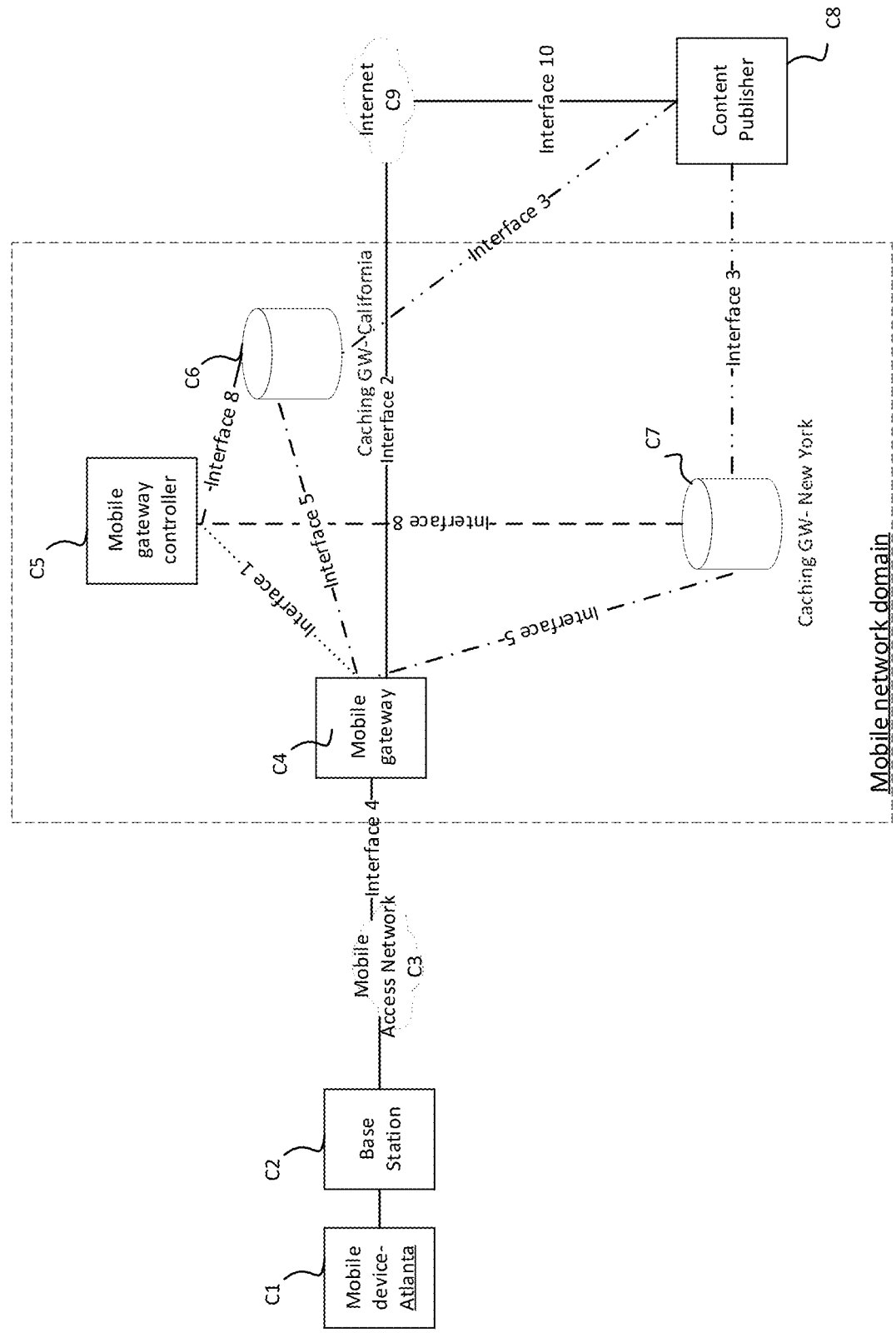
FIG. 6 illustrates an example block diagram of a mobile gateway system for an integrated content delivery in which separate caching gateways are spatially deployed in a mobile network domain.

FIG. 6 illustrates an example block diagram of a mobile gateway system for an integrated content delivery in which separate caching gateways are spatially deployed in the mobile network domain. FIG. 6 may provide exemplary embodiments on how to perform various processes of the integrated content delivery serviced within the mobile network domain to thereby obtain advantageous effects for, for example, optimal routing, avoidance of traffic congestion and optimizing the content delivery service. Referring to FIG. 6, a mobile device C1 may camp and operate in Atlanta, Ga. USA. The mobile device C1 may send a request for delivering a specific content to the mobile gateway C4 through a mobile access network C3. To provide the requested content to the mobile device C1, the mobile gateway C4 may have three optional connections to serve the requested content, as follows: (option 1) the mobile gateway C4 may connect to a caching gateway C6 camped in California; (option 2) the mobile gateway C4 may connect to a caching gateway C7 in New York; or (option 3) the mobile gateway C4 may perform internet connectivity C9 to obtain the requested content from content publisher C8 where there may be caches placed and controlled by the content publisher C8. Option 3 may be used when the requested content and/or the mobile device C1 do not have the enhanced capability. For determining optimal routing for serving the requested content, the mobile gateway C4 and the mobile gateway controller C5 may construct a metric for the requested content and network policies, and then select (or identify) a caching gateway from the caching gateways C6 and C7 to make a smart decision to use an appropriate caching gateway for serving the requested content. If the mobile gateway C4 is also camping in California, the mobile gateway C5 may determine the caching gateway C6 to be served for the requested content based on the metric, which is constructed by the mobile gateway controller C5, and network information related to least cost transit approach. This embodiment for determining the optimal routing may be applicable to similar solutions to find, for example, route lengths, route charges, topology metrics from algorithms that assist in routing.

In an example embodiment for avoidance of congestion, in case the mobile gateway C4 is not located near either the caching gateway C6 or the caching gateway C7, the mobile gateway C4 may determine to enhance the metrics to take consideration of traffic congestion. For example, if the mobile gateway controller C5 determines that the caching gateway C6 is currently overloaded (as determined by), the mobile gateway controller C5 may select the cache gateway C7 for serving the requested content. In an example embodiment for optimizing the content delivery service, the network topology and effects may be used to serve the requested content. The mobile gateway controller C5 may search or detect a history that other users (or other mobile devices) have previously facilitated that the requested content is cached in the caching gateway C6. The mobile gateway controller C5 may use its metric computation and knowledge of a history for the content delivery services, and the mobile gateway controller C5 may direct a subsequent user (e.g., a user of the mobile device 110) to use the same caching gateway, i.e., the caching gateway C6 rather than the caching gateway C7 according to the metrics computed by the mobile gateway controller C5. As described above in the example embodiments, the mobile gateway C4 and/or the mobile gateway controller C5 may construct specific metrics to optimize the content delivery service. The example embodiments may obtain advantageous effects that network content is served operating within norms (or service intention) of a service provider and rebalancing a value chain in network nodes.

Figure 7:
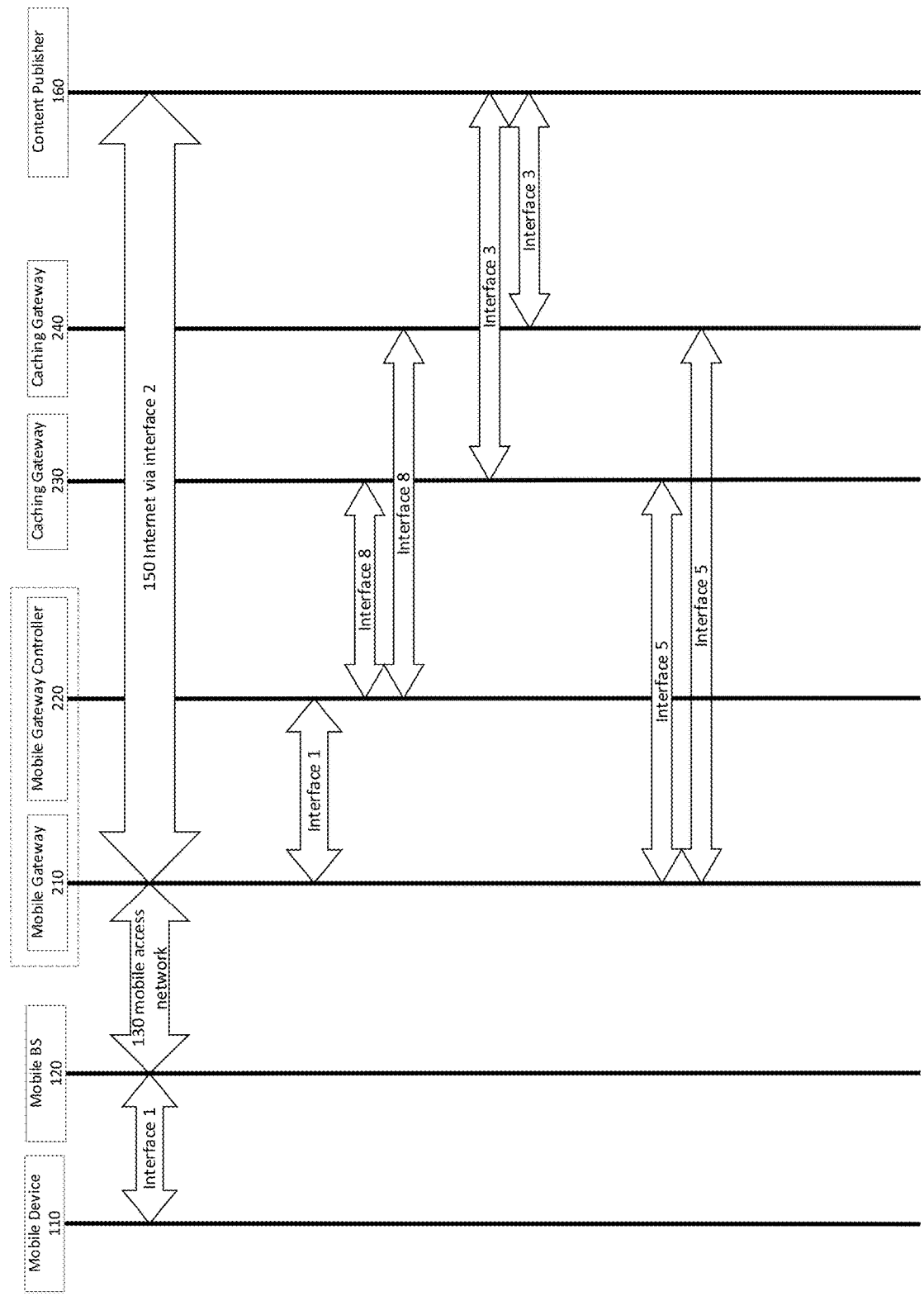
FIG. 7 illustrates an example of interface protocols defined in a mobile gateway system for an integrated content delivery.

FIG. 7 illustrates an example of interface protocols defined in a mobile gateway system for an integrated content delivery. A skilled mobile systems architect will observe that some of the interfaces are well defined in the 3GPP standards—for example Interface 1 from Mobile Device 110 to Mobile BS (Base-station) 120 is also referred to by 3GPP standards as Uu—such well defined standards facilitate rapid creation of the various embodiments. Referring to FIG. 7, the particular embodiments may provide the integrated content delivery in mobile network domain of the mobile network system using the network entities (or network nodes) such as the mobile gateway 210, mobile gateway controller 220, and the mobile caching gateways 230 and 240. To do so, the particular embodiments may define dedicated interface protocols, as described above, such as interface 1, interface 3 and interface 5 and interface 8. The interface 1 is dedicated to interface protocol to communicate between the mobile gateway 210 and the mobile gateway controller 220. The interface 8 is dedicated to interface protocol to communicate between the mobile gateway controller 220 and the mobile caching gateways 230 and 240. The interface 3 is dedicated to interface protocol to communicate between the mobile caching gateways 230 and 240 and the content publisher 160. The interface 5 is dedicated to interface protocol to communicate between the mobile gateway 210 and the mobile caching gateways 230 and 240.

Figure 8:
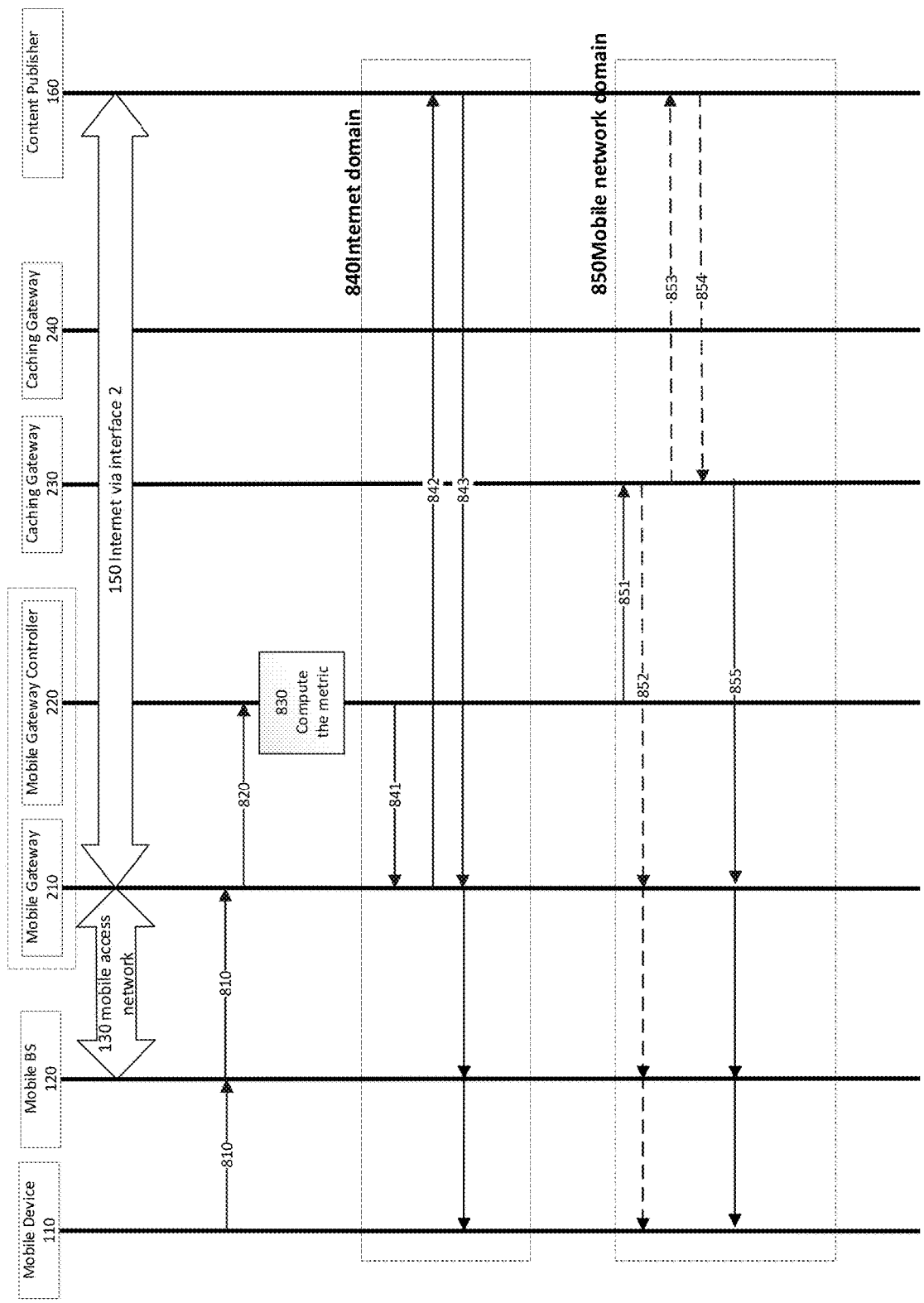
FIG. 8 illustrates an example call flow of a mobile gateway system for an integrated content delivery.

FIG. 8 illustrates an example call flow of a mobile gateway system for an integrated content delivery. Referring to FIG. 8, when the mobile gateway 210 receives a request for delivering a specific content form the mobile device 110 (810), the mobile gateway 210 may send the request to the mobile gateway controller 220 via interface 1 (820). At 820, the mobile gateway may transfer data or information elements about a connection to the mobile gateway controller 220. The mobile gateway controller 220 may perform a process for computing the metric to be used for performing functions for serving the requested content using the mobile caching gateways 230 and 240, based on the data or the information elements sent from the mobile gateway 210 (830). The information may include, for example, information related to quality of service (QoS) and traffic congestion related to connection between the mobile device 110 and the mobile gateway 210. The computed metric may include information used for optimal routing, avoidance of traffic congestion, as described above. If the mobile gateway controller 220 determines that the mobile device and/or the mobile gateway have no enhanced capability, the requested content may be served in the traditional process (i.e., in internet domain) using internet 150, as described above (840). That is, the mobile gateway controller 220 may send instructions to cause the mobile gateway 210 to communicate with the content publisher 160 (841). In response to the instructions at Step 841, the mobile gateway 210 may communicate with the content publisher 160 and then provide the mobile device 110 with the requested content (842 and 843). Meanwhile, if the mobile gateway controller 220 determines that the mobile device and/or the mobile gateway have the enhanced capability, the requested content may be served in mobile network domain of the mobile gateway system using the mobile caching gateways 230 and 240, as described above (850). For example, if the mobile gateway controller 220 identifies (or selects) the mobile caching gateway 230 to distribute the requested content, the mobile caching gateway 230 has a local copy of the requested content in its storage (e.g., computer readable non-transitory record media) and further the local copy of the requested content is not required for accessing permission, the mobile caching gateway 230 may send the local copy of the requested content to the mobile gateway 210 (852). Otherwise, if the mobile gateway controller 220 identifies (or selects) the mobile caching gateway 230 to distribute the requested content and the mobile caching gateway 230 has no local copy of the requested content, the mobile caching gateway 230 may communicate with the content publisher 160 to obtain the requested content such that the mobile caching gateway 230 can retrieve the requested content from the content publisher 160 (853 and 854).

In another embodiment of signaling 853 and 854, in case the mobile caching gateway 230 is determined to have the local copy of the requested content, if the local copy of the requested content is required for permission to access, the mobile caching gateway 230 may communicate with the content publisher 160 to verify with the content publisher 160 whether the mobile caching gateway 230 can retrieve the requested content from the content publisher 160 (853). If the mobile device is verified to have permission to access the requested content, the mobile caching gateway 230 may receive, from the content publisher 160, permission for distributing the requested content (or the copy of the requested content) in a redirection route comprising the mobile caching gateway 230 and the mobile gateway 210 (854). The mobile caching gateway 230 may distribute, to the mobile gateway 210, the copy of the requested content cached therein, or the requested content received from the content publisher 160 (855).

Figure 9:
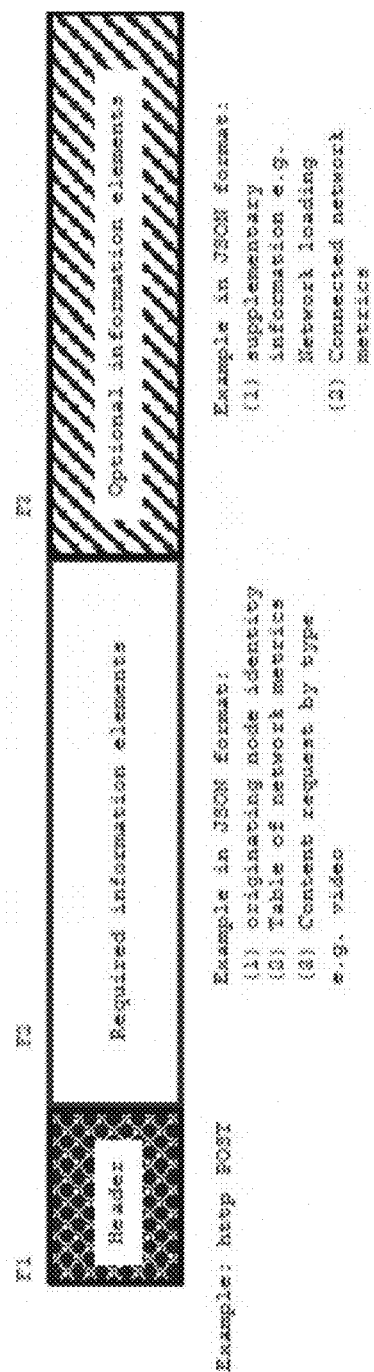
FIG. 9 illustrates an example of a format of HTTP POST message used for integrated content delivery served in the mobile gateway system.

FIG. 9 illustrates an example of a format of HTTP POST message used for integrated content delivery served in the mobile gateway system. The HTTP POST message may be used for inter-node communication, for example in 3GPP core networks of 5G deployments. The HTTP protocol such as, for example, but not limited to, the HTTP POST message, HTTP GET message, HTTP PATCH message, etc., may be also used for communications between the network nodes described in FIGS. 2 to 8 of the present disclosure. Referring to the format of the HTTP POST message in FIG. 9, "F1" field is used for http POST header which may be provided without or with encryption. "F2" field is used for required information elements which are constructed in JSON format for the followings:

Part (1)—the originating node identity. This may be detailed to include manufacturer, software version, protocol version, network address e.g. IPv6 address, if optional elements are present etc.;

Part (2)—a table of network metrics outlining mandatory information, e.g., the identity of the calling mobile device, a cost function for the node that takes into account the loading of the network node;

Part (3)—the type of content being requested e.g., video and an identifier thereof. "F3" field is used for optional information elements—these would be constructed in JSON format for this example:

Part (1)—Simple supplementary information—for example congestion metrics, topology connection metrics etc.;

Part (2)—Connected equipment metrics if they are available to this node—for example next hop IP address etc.

In particular embodiments, a computer system comprising one or more processors may include hardware, software, or both providing one or more communication interfaces (e.g., interfaces 1, 5, and 8 described above) for communication (such as, for example, packet-based communication) between the mobile gateway controller, the mobile gateway and the one or more mobile caching gateways. As an example and not by way of limitation, communication interface of system may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, the computer system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The computer system may include any suitable communication interface for any of these networks, where appropriate. The communication interface may include one or more communication interfaces, where appropriate. Although this disclosure describes and illustrates a particular communication interface, this disclosure contemplates any suitable communication interface.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving, from a mobile gateway associated with the computing system, a first request for first content provided by a content publisher, the first request being sent from a mobile device;
   determining, based on meta data associated with the mobile gateway, that the mobile gateway is capable of providing the first content through one or more caching gateways associated with the mobile gateway;
   identifying at least one of the one or more caching gateways to provide the requested first content; and
   sending, to the mobile gateway, first instructions configured to cause the mobile gateway to obtain the requested first content from the identified at least one caching gateway.

2. The method of claim 1, further comprising:
   determining that the mobile gateway is configured to selectively service content requests using the one or more caching gateways.

3. The method of claim 1, further comprising:
   determining that the requested first content is of a predetermined content type; and
   determining that the requested first content is to be provided through the one or more caching gateways based on the determination that the requested first content is of the predetermined content type.

4. The method of claim 1, further comprising:
   generating a traffic quality profile for the requested first content; and
   determining that the requested first content is to be provided through the one or more caching gateways based on the generated traffic quality profile.

5. The method of claim 1, further comprising:
   receiving, from the mobile gateway, a second request for second content provided by the content publisher;
   determining, based on information associated with the second request and the one or more policies, that the one or more caching gateways are not to provide the second content to the mobile gateway;
   sending, to the mobile gateway, second instructions configured to cause the mobile gateway to obtain the second content from the content publisher through an internet protocol.

6. The method of claim 1, wherein the identifying the at least one caching gateway to provide the requested first content is based on routing metrics or congestion status associated with the one or more caching gateways.

7. The method of claim 1, wherein the identifying the at least one caching gateway to provide the requested first content is based on a historical record of the first content being provided through and cached by the at least one caching gateway in response to another request.

8. The method of claim 1, further comprising:
   generating a mobile profile associated with the first request and the mobile device;
   sending third instructions comprising the mobile profile to the at least one caching gateway, wherein the third instructions are configured to cause the at least one caching gateway to verify with the content publisher whether the mobile device has permission to access the requested first content; and
   receiving, from the at least one caching gateway, an indication representing that the mobile device has permission from the content publisher to access the requested content.

9. The method of claim 8, whether the third instructions are sent to, and the indication is received from, the one or more caching gateways via an interface protocol dedicated for communications with the one or more caching gateways.

10. The method of claim 9, further comprising:
    monitoring the one or more caching gateways via the dedicated interface protocol.

11. A system comprising:
    one or more processors; and
    one or more computer-readable non-transitory storage media coupled to one or more of the processors and comprising instructions operable when executed by one or more of the processors to cause the system to:
    receive, from a mobile gateway associated with the computing system, a first request for first content provided by a content publisher, the first request being sent from a mobile device;
    determine, based on meta data associated with the mobile gateway, that the mobile gateway is capable of providing the first content through one or more caching gateways associated with the mobile gateway;
    identify at least one of the one or more caching gateways to provide the requested first content; and
    send, to the mobile gateway, first instructions configured to cause the mobile gateway to obtain the requested first content from the identified at least one caching gateway.

12. The system of claim 11, wherein the one or more processors are further operable when executing the instructions to
    determine that the mobile gateway is configured to selectively service content requests using the one or more caching gateways.

13. The system of claim 11, wherein the one or more processors are further operable when executing the instructions to:

determine that the requested first content is of a predetermined content type and determine that the requested first content is to be provided through the one or more caching gateways based on the determination that the requested first content is of the predetermined content type.

14. The system of claim 11, wherein the one or more processors are further operable when executing the instructions to:

generate a traffic quality profile for the requested first content; and generate that the requested first content is to be provided through the one or more caching gateways based on the generated traffic quality profile.

15. The system of claim 11, wherein the one or more processors are further operable when executing the instructions to receive, from the mobile gateway, a second request for second content provided by the content publisher;

determine, based on information associated with the second request and the one or more policies, that the one or more caching gateways are not to provide the second content to the mobile gateway; and send, to the mobile gateway, second instructions configured to cause the mobile gateway to obtain the second content from the content publisher through an internet protocol.

16. The system of claim 11, wherein the one or more processors are operable to execute the instructions to identify the at least one caching gateway to provide the requested first content, based on routing metrics or congestion status associated with the one or more caching gateways.

17. The system of claim 11, wherein the one or more processors are operable to execute the instructions to identify the at least one caching gateway to provide the requested first content, based on a historical record of the first content being provided through and cached by the at least one caching gateway in response to another request.

18. The system of claim 11, wherein the one or more processors are further operable when executing the instructions to generate a mobile profile associated with the first request and the mobile device;

send third instructions comprising the mobile profile to the at least one caching gateway, wherein the third instructions are configured to cause the at least one caching gateway to verify with the content publisher whether the mobile device has permission to access the requested first content; and receive, from the at least one caching gateway, an indication representing that the mobile device has permission from the content publisher to access the requested content.

19. The system of claim 18, whether the one or more processors are operable when executing the instructions to send the third instructions to, and receive the indication from, the one or more caching gateways via an interface protocol dedicated for communications with the one or more caching gateways, and the one or more processors are further operable when executing the instructions to monitor the one or more caching gateways via the dedicated interface protocol.

20. One or more computer-readable non-transitory storage media embodying software that is operable when executed to:

receive, from a mobile gateway associated with the computing system, a first request for first content provided by a content publisher, the first request being sent from a mobile device;

determine, based on meta data associated with the mobile gateway, that the mobile gateway is capable of providing the first content through one or more caching gateways associated with the mobile gateway;

identify at least one of the one or more caching gateways to provide the requested first content; and send, to the mobile gateway, first instructions configured to cause the mobile gateway to obtain the requested first content from the identified at least one caching gateway.

* * * * *